L. VON LOSSAU.
LIQUID MEASURER.
APPLICATION FILED MAY 22, 1914.
1,211,794. Patented Jan. 9, 1917.
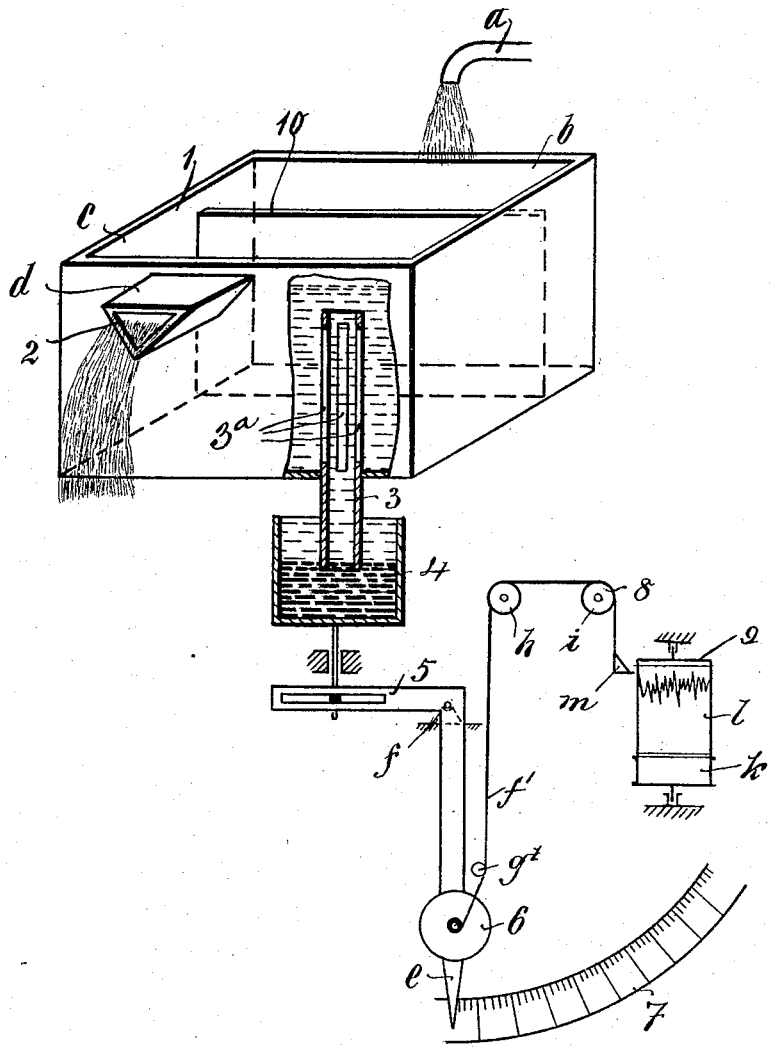
Witnesses:
B. Dommers
E. Leckert
Inventor
Louis von Lossau,
By [signature]
atty.

UNITED STATES PATENT OFFICE.

LOUIS von LOSSAU, OF SAARBRÜCKEN, GERMANY.

LIQUID-MEASURER.

1,211,794.     Specification of Letters Patent.     Patented Jan. 9, 1917.

Application filed May 22, 1914. Serial No. 840,227.

*To all whom it may concern:*

Be it known that I, LOUIS VON LOSSAU, a subject of the German Emperor, residing at Saarbrücken, Germany, have invented certain new and useful Improvements in Liquid-Measurers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a method of and mechanism for measuring quantities of a liquid flowing through a container.

Liquid measuring devices are known in which the liquid to be measured flows through a vessel connected to an indicator. The movements of the entire vessel due to the weight of the liquid in the vessel are communicated to the indicator, and so indicate the quantity of liquid flowing through the vessel. In these devices the entire weight of the liquid flowing through the vessel acts on the indicator.

According to the present invention the measuring of the liquid is also effected by the weight of the liquid, but this is accomplished not by causing the weight of the entire body of liquid in the vessel to act on the indicator, but only a small fraction thereof, sufficient to actuate the indicator under varying heads of liquid, and acting only on a fraction of the bottom surface or area of the vessel. The method therefore consists in that the liquid is passed through a container having the liquid over a small portion of its area used as the active actuating means for the indicator. This column of liquid over a small area acts upon a balance, so that only the weight of a small portion of the entire volume of the liquid under varying heads will be used to accomplish the indicating or measuring operation.

In the drawings I have shown, by way of example, one form of mechanism embodying my invention.

Many other forms of apparatus may be used without departing from the invention, and which operate on the same principles set forth herein.

The liquid is admitted to the vessel 1 through a pipe $a$ to a chamber $b$ contained between the rear wall of the vessel and a partition 10. The liquid rises in the chamber $b$ and flows in a uniform stream over the upper edge of the partition 10 into the main chamber $c$. The object of the chamber $b$ is to deliver the liquid to chamber $c$ with as little surface disturbance as possible, and thus maintain the surface of the liquid in chamber $c$ level.

The liquid is discharged from chamber $c$ through spout 2, which is triangular in cross section and closed at its top $d$.

Into chamber $c$ projects an open-ended pipe 3 which communicates with the chamber through perforations $3^a$ and whose lower end enters an open-top vessel 4 containing a liquid heavier than the liquid to be measured and not miscible therewith, for example, mercury, thereby sealing the lower end of the pipe 3 and preventing the escape of the liquid entering the said pipe from the chamber $c$.

The vessel 4 rests on an angular scale beam 5 which is mounted on a bearing $f$ and is counter-balanced by a weight 6 carrying an index hand $e$ that moves in front of an arcuate scale 7.

The weight 6, or the arm carrying it, may or may not be connected to a recording mechanism of known type. For example, a drum $g$ driven by a clock-work $k$ carries a record sheet $l$ with which contacts a stylus $m$ suspended on a cord $f'$ guided over pulleys $g'$, $h$ $i$.

As the level of the liquid in chamber $c$ varies, the hydrostatic pressure in pipe 3 varies accordingly, and therewith the position of the scale beam 5.

With the aid of the weights indicated on the scale 7, or recorded on the record sheet $l$ the weight of liquid passing through 2 can be readily ascertained.

If the apparatus is standardized for water, then when any other liquid is measured its specific gravity will be taken into consideration in connection with the weights indicated.

I claim—

1. Mechanism for weighing liquids, comprising a container, a pipe passing into the container surrounded by and communicating with the body of liquid in the container, means to liquid seal the other end of the pipe and movable with respect thereto, and a scale beam to which said means transfers its load.

2. Mechanism for weighing liquids, comprising a container, a perforated pipe passing through the bottom of the container and communicating therewith through said perforations, a vessel containing a liquid for sealing the lower end of said pipe and a scale beam for directly supporting said vessel.

3. Mechanism for weighing liquids, comprising a container through which a liquid flows, means in the bottom of said container extending over a fraction of the area thereof to receive the weight of a liquid column over said area, and a balancing indicating device actuated by said means.

4. Mechanism for weighing liquids, comprising a container through which a liquid flows, a stationary pipe passing through the container, open to the interior thereof and surrounded by the contents, a mercury seal for the bottom of said pipe to automatically compensate for change of volume due to temperature changes, said seal directly connected to a scale beam.

In testimony that I claim the foregoing as my invention, I have signed my name in presence of two subscribing witnesses.

LOUIS von LOSSAU.

Witnesses:
JEAN GRUND,
CARL GRUND.

Copies of this patent may be obtained for five cents each, by addressing the "Commissioner of Patents, Washington, D. C."